US008215878B2

(12) United States Patent
Rozzi et al.

(10) Patent No.: US 8,215,878 B2
(45) Date of Patent: Jul. 10, 2012

(54) INDIRECT COOLING OF A ROTARY CUTTING TOOL

(75) Inventors: Jay Christopher Rozzi, Hanover, NH (US); John Kendall Sanders, Hartland, VT (US); Christian Henry Passow, Etna, NH (US); Michael Phillip Day, Cornish, NH (US); Everett Edgar Archibald, Jr., Windsor, VT (US)

(73) Assignee: Creare Incorporated, Hanover, NH (US)

( * ) Notice: Subject to any disclaimer, the term of this patent is extended or adjusted under 35 U.S.C. 154(b) by 344 days.

(21) Appl. No.: 12/428,201

(22) Filed: Apr. 22, 2009

(65) Prior Publication Data

US 2010/0272529 A1 Oct. 28, 2010

(51) Int. Cl.
B23B 27/10 (2006.01)
(52) U.S. Cl. .................................. 407/11; 407/2; 407/6
(58) Field of Classification Search .................. 407/2, 6, 407/11, 113
See application file for complete search history.

(56) References Cited

U.S. PATENT DOCUMENTS

| 5,237,894 | A | 8/1993 | Lindeke |
| 5,761,974 | A | 6/1998 | Wang et al. |
| 6,053,669 | A | 4/2000 | Lagerberg |
| 7,252,024 | B2 | 8/2007 | Zurecki et al. |
| 7,963,729 | B2 * | 6/2011 | Prichard et al. ................. 407/11 |
| 8,061,241 | B2 * | 11/2011 | Rozzi et al. ........................ 82/46 |
| 2002/0106250 | A1 * | 8/2002 | Murakawa et al. ............. 407/11 |
| 2006/0053987 | A1 * | 3/2006 | Ghosh et al. .................. 82/1.11 |
| 2006/0263153 | A1 * | 11/2006 | Isaksson ........................ 407/113 |
| 2008/0175676 | A1 * | 7/2008 | Prichard et al. ................. 407/11 |
| 2010/0254772 | A1 * | 10/2010 | Rozzi et al. ..................... 407/11 |
| 2011/0229277 | A1 * | 9/2011 | Hoffer et al. .................... 407/11 |

FOREIGN PATENT DOCUMENTS

| DE | 102008020740 A1 | 10/2009 |
| EP | 0599393 A1 | 6/1994 |
| EP | 599393 A1 * | 6/1994 |
| EP | 1395391 | 3/2004 |
| JP | 08039387 A * | 2/1996 |
| JP | 2003266208 A * | 9/2003 |

(Continued)

OTHER PUBLICATIONS

PCT/US2010/031884 Forms PCT/ISA/210 and PCT/ISA/237 International Search Report and Written Opinion, Dated Dec. 20, 2010, 7 pages.

(Continued)

*Primary Examiner* — Boyer D Ashley
*Assistant Examiner* — Sara Addisu
(74) *Attorney, Agent, or Firm* — Reising Ethington P.C.

(57) ABSTRACT

An indirect cooling system for a rotating cutting tool uses a cryogenic coolant that is delivered to a cavity formed on the back surface of the cutting element, providing cooling near the cutting edge of the element. Because the total flow rate of the working fluid is low (less than 0.08 Liters/min/cutting edge), the fluid can be safely vented to atmosphere from the cavity, and as a result, no specialized coolant recovery or ventilation equipment is needed. The cavity may be formed with fins to enhance the heat transfer between the cutting element and the coolant, and coolant may additionally be sprayed directly onto the exterior surface of the element to cool the tool-chip interface. The indirect cooling system may be used for hard to machine metals and composites, as well as the machining of conventional materials without the use of traditional cutting fluids.

9 Claims, 3 Drawing Sheets

FOREIGN PATENT DOCUMENTS

| | | |
|---|---|---|
| JP | 2005271201 A * | 10/2005 |
| WO | WO 9605008 A1 * | 2/1996 |
| WO | 99/60079 | 11/1999 |
| WO | 2008/014933 A1 | 2/2008 |
| WO | 2008/044115 A1 | 4/2008 |
| WO | 2008/104341 | 9/2008 |

OTHER PUBLICATIONS

Sutherland, J.W., 2000, "Cutting Fluid Issues," www.mfg.mtu/marc/research.

Zhao, Z. and Hong, S.Y., 1992, "Cooling Strategies for Cryogenic Machining from a Materials Viewpoint," Journal of Materials Engineering and Performance, vol. 1, No. 5, pp. 669-678.

Paul, S., Dhar, N. R., Chattopadhyay, A.B., 2001,"Beneficial Effects of Cryogenic Cooling Over Dry and Wet Machining on Tool Wear and Surface Finish in Turning AISI 1060 Steel," Journal of Materials Processing Technology, vol. 116, pp. 44-48.

Nishiwaki, N., Hidehiko, T., and Hon S., 1981, "A Method for Improving the Thermal Behaviour of Machine Tools with Heat Pipes," Bulleting of the Japan Society of Precision Engineering, vol. 15, No. 4, pp. 249-250.

Hong, S.Y. and Ding, Y., 2001, "Micro-Temperature Manipulation in Cryogenic Machining of Low Carbon Steel," Journal of Materials Processing Technology, vol. 116, pp. 22-30.

Lopez de Lacalle, L., Perez-Bilbatua, J., Sanchez, J., Llorente, J., Gutierrez, A., and Alboniga, J., 2000, "Using High Pressure Coolant in the Drilling and Turning ofLow Machinability Alloys," International Journal of Advanced Manufacturing Technology, vol. 16, pp. 85-91.

Wang, Z.Y. and Rajurkar, K.P., 2000, "Cryogenic Machining of Hard-to-Cut Materials,"Wear, vol. 239, pp. 168175.

* cited by examiner

INDIRECT COOLING OF A ROTARY CUTTING TOOL

This invention was made with Government support under Contract Nos. N00421-04-P-0547 and N68335-06-C-0069 awarded by the Department of the Navy. The Government has certain rights in the invention.

FIELD

A cooling system for the tool-chip interface of a rotary cutting tool uses both indirect and direct cooling of the cutter edge by a cryogenic fluid to enable the high-speed machining of titanium alloys and other advanced materials with low thermal conductivity.

BACKGROUND

Cutting fluids have been used in machining processes for many years to increase lubricity by spraying the coolant into the machining zone directly on the cutting tool and the workpiece. This has the effect of decreasing the friction between the chip and the tool, which in turn decreases the tool temperature, increases tool life, and improves the part quality. These benefits come with certain drawbacks. In high-volume machining operations, at least 16% of the machining cost is associated with the procurement, maintenance, and disposal of cutting fluids. This cost does not account for the health risks workers are exposed to when using these fluids. Contact with cutting fluids or their mists can cause maladies such as dermatitis and respiratory diseases. Some additives in cutting fluids may be carcinogenic.

In recent years, because of these problems, the high-volume machining industry has moved toward dry machining to reduce or eliminate the use of cutting fluids. However, this option increases fossil fuel consumption and energy costs because larger, and more powerful machines are required to process the less lubricious material. Dry machining also increases the per part costs by consuming more cutting tools and requiring more machining time. The problem is exacerbated when machining titanium or other low thermal conductivity materials since the heat produced at the tool-chip interface is not readily conducted away from the interface by the material itself. Further, dry machining is not feasible for relatively small shop sites, where the capital for new machines is often not available.

Past research efforts and patents have focused on internally or externally cooling the cutting tool holder, spraying liquid nitrogen into the machining zone, using high-pressure coolants, and the integration of a cap-like reservoir on top of the cutting tool insert that is cooled by liquid nitrogen.

Internally and externally cooling the cutting tool has been experimentally tested using heat pipes. Some degree of cooling was achieved, but the heat transfer efficiency of the design is very low. No measurements of cutting tool flank wear reduction were made, possibly due to the poor performance of the system on the bench-top.

The use of high pressure jets of coolant to reduce the tool wear has also been investigated. Such an approach can effectively decrease tool wear, but has several drawbacks. First, the jets require pressurized coolant using a large compressor that consumes electrical power, which increases the cost and environmental impact of the process. Second, the jets need to be applied to particular locations on the cutting tool insert. This requires accurate and repeatable positioning of the small diameter, high-pressure jet relative to the cutter edge. This approach is not feasible in a production environment, where the overhead associated with managing the high-pressure liquid jet quickly drives up the machining time and the costs. Third, the high-pressure jets require liquid flow rates that are one to three orders of magnitude larger than the cooling system disclosed herein. This fact dramatically increases the cost and the environmental impact of using high pressure jets.

Another approach involves the integration of a cap-like reservoir cooled with liquid nitrogen on top of the cutting tool insert, and this has been shown to decrease the tool wear for lathe turning operations where the tool is stationary. This approach has a relatively low heat transfer efficiency requires cryogen flow rates that are two to three orders of magnitude larger than with the present design. Because the reservoir is located on top of the cutting tool insert, the device is difficult to use in a production environment. In order to index or change the insert in lathe turning, the operator needs to remove and reattach the reservoir, which is at cryogenic temperatures. These operations require special training, increasing costs, and increasing the health risks to operators. For these reasons, it is unlikely that such a system would be used in a production environment, especially with a rotating tool.

SUMMARY OF THE DEVICE

It has been determined that delivery of cryogenic fluid to the tool-chip interface is useful for many applications, including the high speed machining of titanium alloys, the high speed machining of ceramic matrix composites, the high speed machining of aluminum metal matrix composites, as well as the environmentally friendly machining of conventional materials without the use of traditional cutting fluids. As used herein, the term cryogen or cryogenic refers to a liquid, such as liquid nitrogen ($LN_2$), that boils at a temperature below about 110 K (−160° C.) and is used to obtain very low temperatures. The main benefit of using a cryogenic liquid in this application is the use of the latent heat of vaporization of the cryogen as a means to remove heat from the tool-chip interface. As opposed to sensible heat transfer, where any heat gain by a single-phase fluid is accompanied by a temperature rise; latent heat transfer uses the isothermal phase change from a saturated liquid to vapor as a means to absorb heat.

The amount of cryogen needed for effective cooling is a function of the heat transfer rate to the tool during machining. The volumetric heat generation, $q'''$, associated with a machining operation is expressed as;

$$q''' = \frac{\psi}{V} \int_V \dot{\varepsilon} \overline{\sigma} dV$$

where $\dot{\varepsilon}$, $\overline{\sigma}$, and V are the strain rate during machining, the material flow stress, and the volume of the strained material, known as the primary shear zone, respectively. The constant $\psi$ represents the fraction of the deformation energy that is dissipated as sensible heating. For metals, the value of this constant is 0.8 or higher. The energy generated in the primary shear zone can be manifested as heating of the eventual chip after machining or be transferred to the tool. The fraction of heat flowing into the tool is a function of the tool geometry, the material, the machining conditions, and other variables. Established methods (analytical and computational) were used to estimate the maximum heat transfer rate into each cutting edge on the tool, $q_t$. For the majority of conditions associated with machining advanced materials, the heat transfer rate was a maximum of 200 W per cutting edge. At atmospheric pressure, the latent heat of vaporization of liquid nitrogen ($LN_2$) is approximately 180 Joules/gram. This implies that only 0.07 L/min (or 1.1 gram/sec) of $LN_2$ is needed to dissipate the thermal energy per cutting edge if it can be delivered in close proximity to the cutting edge. Approximately ten times the flow rate of gaseous nitrogen ($GN_2$) would be required to remove the same amount of heat with a temperature difference of 10 K. Thus, using $LN_2$ minimizes the overall coolant flow requirements.

The cryogen is delivered from a fixed source, through a vacuum-insulated tube, and through other hardware mounted within the machine tool spindle, prior to reaching the tool. The cryogen is at a saturated condition as it leaves the source and flows toward the tool. A saturated condition means that any input of heat to the cryogen as it flows will result in the vaporization of some of the liquid to vapor. A key element of the components that are upstream of the tool itself is the minimization of heat transfer into the cryogen from the environment, also known as the heat leak into the cryogen. The heat leak can never be made to be zero; hence the flow after it leaves the source is known as a two-phase flow, where liquid and gas exist simultaneously. Minimizing the heat leak into the cryogen maximizes the liquid fraction in the two-phase flow, increases the amount of latent heat transfer at the cutter edge, and reduces the overall flow rates needed for effective cooling.

The cryogen is delivered to channels machined within a rotary tool holder to facilitate the effective heat removal from the cutting edge. The cryogen travels through these channels to a cavity formed on the back surface of the cutter element, enabling effective cooling near the cutting edge of the element. Because the total flow rate of the cryogen is low (less than 0.08 Liters/min/cutting edge), the fluid can be safely vented to atmosphere from the cavity in the back of the insert, and as a result, no specialized coolant recovery or ventilation equipment is needed. Based on present estimates, up to 0.07 L/min/cutting edge is used for latent heat transfer, while 0.1 L/min/cutting edge absorbs upstream heat leaks. The vapor quality of the two-phase flow entering the cutting edge is therefore approximately 0.13. The need to use large flow rates of cryogens (>1 L/min) and the associated ventilation requirements are significant limitations associated with the prior art. In the foregoing discussion, the term cryogen will be used to describe the coolant flow through the tool. For the system described herein, the term cryogen is understood to be a two-phase flow.

The invention is designed to be used with standard end mills and other rotary cutting tools; and as a result, it can be easily integrated with current manufacturing operations.

BRIEF DESCRIPTION OF THE DRAWING FIGURES

DETAILED DESCRIPTION OF THE PREFERRED EMBODIMENT

Figure 1:
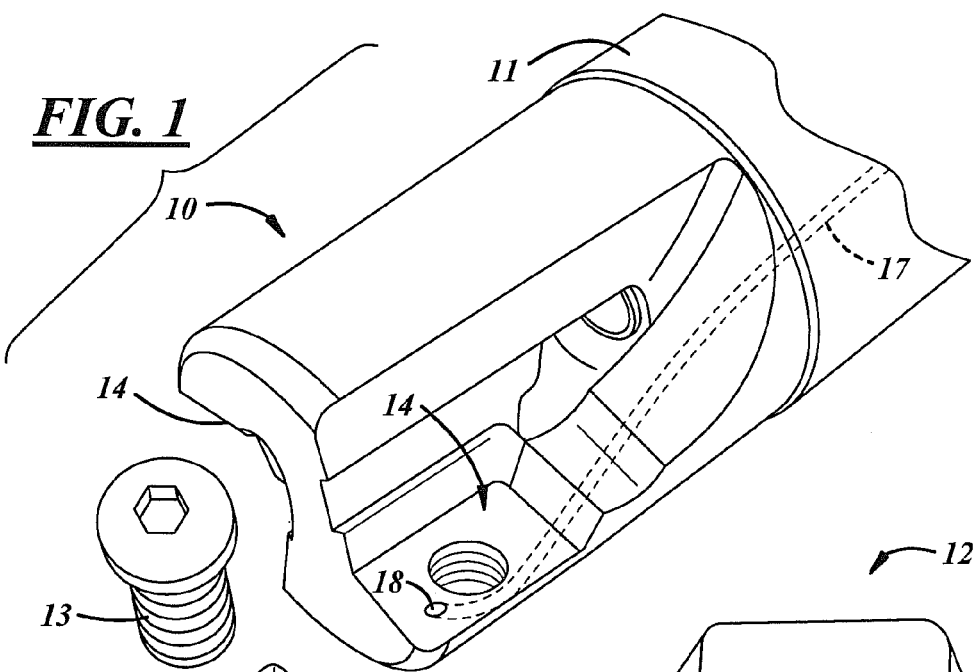
FIG. 1 is a detail view of the working end of an end mill and a cutting tool insert.

FIG. 1 shows the end of a rotary cutting tool, such as an end mill, generally designated by the reference numeral 10. An insert 12 may be secured in a pocket 14 in the end of the tool body 11 by a screw 13. The insert 12 has a cutting edge 15 that wraps around the corner of the insert. The particular milling cuter shown has two pockets 14 for receiving two inserts 12 that are disposed 180 degrees from one another, although end mills having pockets for receiving other numbers of inserts are well known in the art. Also, fluted end mills that have no inserts but have integrally formed flutes for cutting the workpiece, or cutting elements that are brazed or otherwise attached to the cutter body, are also well known in the art. Those practiced in the art of machining will appreciate that the indirect cooling system as described herein can apply to any rotating tool, with integral or attached cutting edges, or with inserts.

As shown in FIG. 1, the insert 12 is cooled indirectly by having cryogen applied to the rear face of the insert as described below.

Cryogen is delivered to the rotary cutting tool 10 either through the spindle or by a rotary coolant holder (not shown) that couples to the tool holder in which the end mill 10 is mounted. A channel 17 is formed in the end mill 10 to deliver coolant to an outlet 18 in the pocket 14 so that the coolant can be delivered to the rear face 16 of the insert 12. An exhaust outlet 19 is formed at the front of the insert 12 to allow vaporized cryogen (gas) to be vented to the atmosphere.

Figure 2:
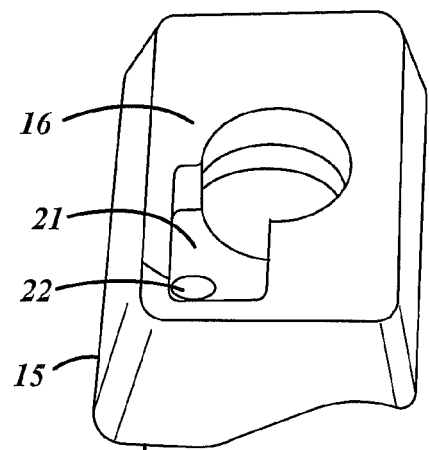
FIG. 2 shows the rear face of the insert shown in FIG. 1.

FIG. 2 shows the back of the insert 12 of FIG. 1. A cavity 21 is formed in the rear face 16 of the insert opposite the cutting edge 15 such as by electro-discharge machining (EDM), or other machining method. The position of the cavity 21 on the rear face 16 delivers the cryogen in close proximity to the cutting edge 15 of the insert. The enhanced surface area created by the cavity 21 within the insert increases the heat transfer between the insert and the cryogen that is delivered to the cavity from the outlet 18. An exhaust port 22 is formed in the cavity 21 that is in communication with the exhaust outlet 19 shown on the front of the insert.

In use, with the insert 12 in place in the pocket 14 of the tool, a cryogen is delivered through the channel 17 to the outlet 18 where it enters the cavity 21 formed in the rear face of the insert. The cryogen removes heat from the insert, and the heat removal is most pronounced in the region of the cutting edge 15 of the insert that is immediately adjacent to the outlet 18 where the cryogen enters the cavity 21. Vaporized cryogen (gas) is exhausted from the cavity 21 by the exhaust port 22 on the front of the insert. In the case of liquid nitrogen, the flow of coolant that is required is approximately 0.08 L/min for each cutting edge compared with flood cooling using conventional coolant at a flow rate of 15 liters per minute.

Figure 3:
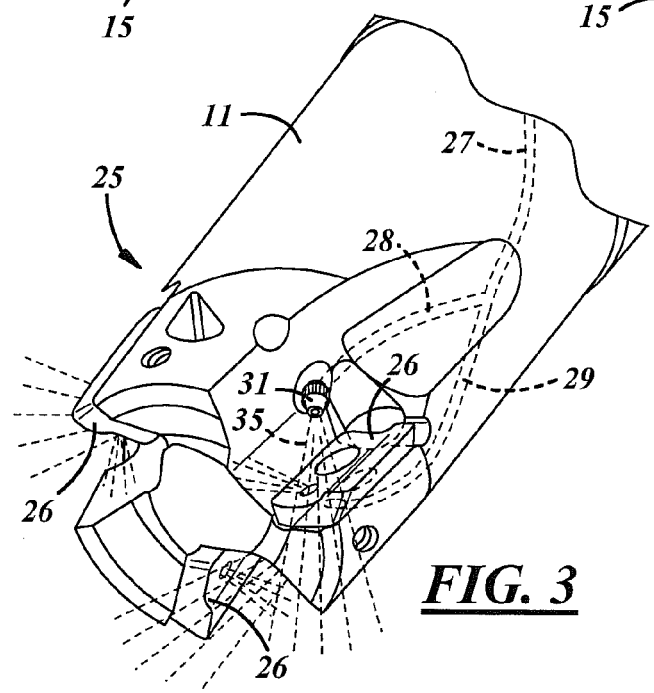
FIG. 3 shows an end mill having both direct and indirect cryogen cooling of the tool-chip interface.
Figure 4:
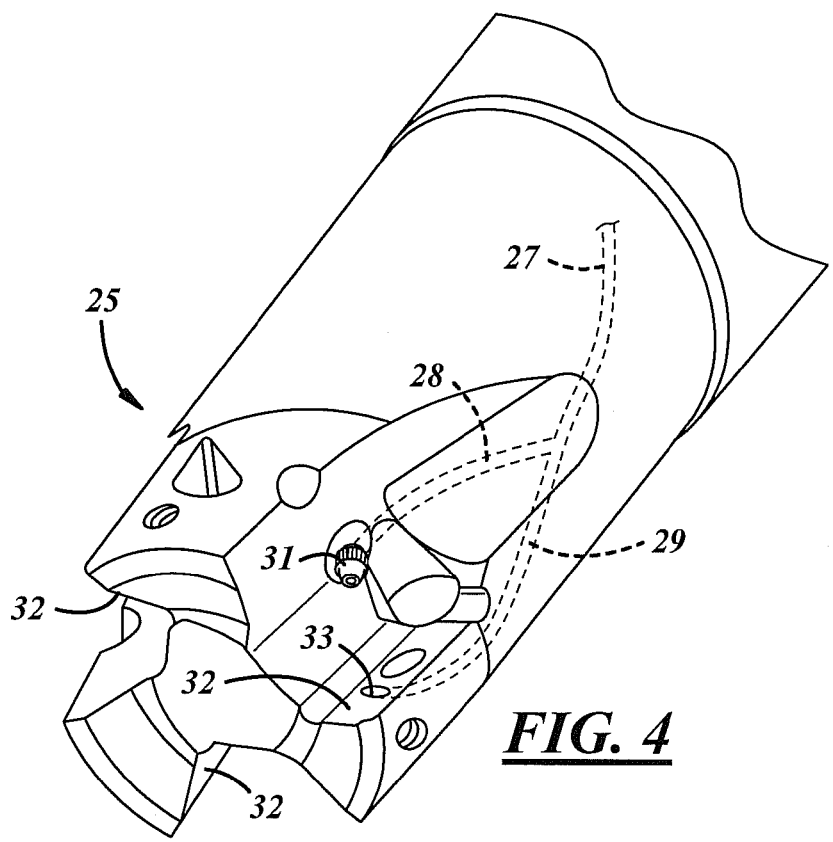
FIG. 4 shows the end mill of FIG. 3 with the inserts removed.

FIGS. 3 and 4 are detail views of an alternate embodiment of an endmill 25 showing cutting tool cooling through the use of both direct and indirect cooling ports. The endmill 25 has three pockets 32 for receiving three inserts 26. The cryogen flows from a suitable source through an internal insulated channel 27 in the endmill 25 toward the cutting tip of the tool where the flow splits to form a direct cooling channel 28 and an indirect cooling channel 29. The cooling channels for only one of the inserts 26 are shown, and similar channels are provided for the other inserts 26. The direct cooling channel 28 terminates in a jet opening 31 on the endmill that is spaced from the insert 26 that sprays a stream 35 of cryogen directly onto the tool-chip interface. The indirect cooling channel 29 directs the coolant flow to an outlet 33 that is positioned in the tool pocket 32 to direct the coolant to the back surface of the insert 26 as described above in connection with FIGS. 1 and 2.

Figure 5:
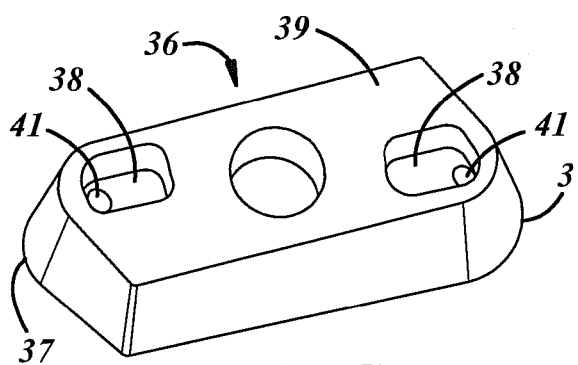
FIGS. 5 and 6 are back and front views, respectively, of an insert with cavities for receiving a cryogen.
Figure 6:
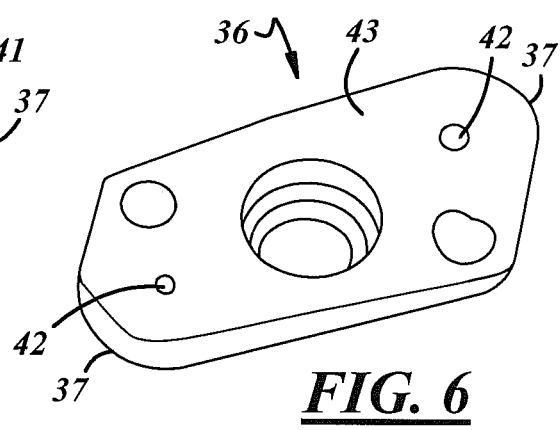

FIGS. 5 and 6 show the back 39 and the front 43, respectively, of an insert 36 which has two cutting edges 37, only one of which will be used at a time. The insert 36 has two generally rectangular cavities 38 formed in the rear surface 39 thereof. Each cavity 38 is positioned on the insert 36 to be closely adjacent to a cutting edge 37 to maximize the cooling effect of the cryogen that is applied to the back of the insert. An exhaust port 41 is formed in each cavity 38 on the rear face 39 of the insert that leads to an exhaust outlet 42 on the front face 43 of the insert as shown in FIG. 6 to vent warmed cryogen from the cavity 38 to atmosphere.

Figure 7:
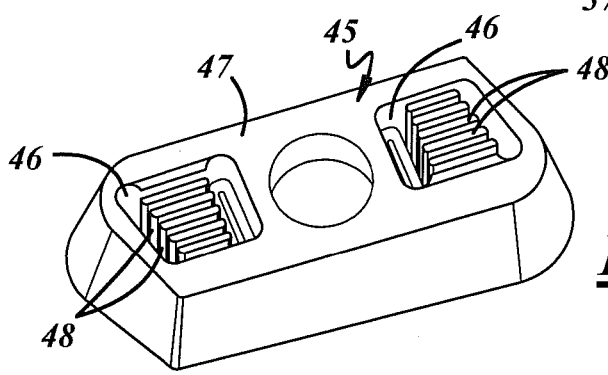
FIG. 7 is a back view of an insert with cavities having integrally formed fins.

FIG. 7 shows an alternative form of an insert 45 in which each cavity 46 formed in the rear face 47 of the insert includes integral fins 48. The fins 48 provide increased surface area contact between the cryogen and the insert 45 to further enhance the heat transfer from the insert to the cryogen. Each cavity 46 includes an exhaust port (not shown) to allow cryogen to be vented to the atmosphere through an exhaust outlet formed on the front of the insert.

Test Results

Machining was performed using a rotating cutting tool with prior art flood cooling and a rotating cutting tool with inserts 12 using the indirect cooling system shown in FIGS. 1 and 2. Each cutting tool configuration was used to machine four slots in succession in a test block of titanium. After the test, the inserts 12 were removed and examined for tool wear. The average extent of the flank wear scar was measured and the tool life was predicted using an industry standard of 0.3 mm of wear as the amount of wear that could be tolerated before the tool had to be replaced. This test shows a 478% increase in tool life for the indirect cooled insert as shown in FIGS. 1 and 2 compared to the flood cooled insert.

TABLE 1

Tool Wear Results from Titanium Machining
Experiments at a Surface Speed of 200 ft/min

| Indirect Cutting Tool Cooling | Flood Cooling |
|---|---|
| Depth of Cut = 0.125 inch | Depth of Cut = 0.125 inch |
| ~0.16 L/min of $LN_2$ | 15 L/min of Coolant |
| Tool Life = 18.5 minutes | Tool Life = 3.2 minutes |

Figure 8:
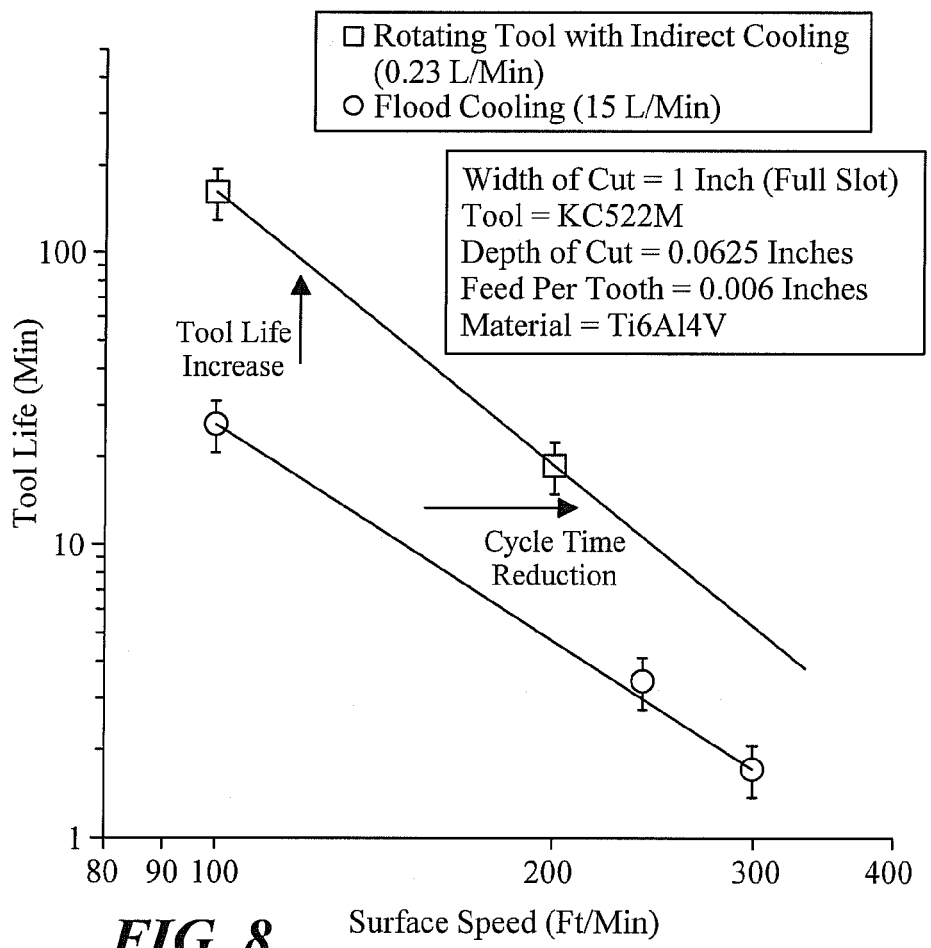
FIG. 8 is a graph showing the effect of surface speed on tool life using different tool lubricating and cooling techniques.

The results of the tool life tests for a rotating tool with indirect cooling are plotted in FIG. 8 for the embodiment shown in FIGS. 3 and 4. The tests were performed using a three insert one-inch end mill as shown in FIG. 3 cutting at 0.0625 depth of cut that is 1.0 inches wide. The plot shows that at surface speeds near 200 ft/min, the increase in tool life with a tool having indirect cooling of the inserts with a flow rate of 0.23 Liters/min (approximately 0.08 L/min/cutting edge for three edges) compared to a tool with conventional flood cooling requiring up to 15 Liters/min of standard synthetic coolant is similar to the increase in tool life shown in connection with the tool wear results given in Table 1 above. This improvement in performance directly reduces the cost of machining by enabling increased cutting speeds with no decrease in tool life compared to a conventional coolant. This result demonstrates the importance of the local thermal resistance near the cutting edge of the insert. By machining a simple cavity in the insert as shown in FIG. 2 or 5, with no surface enhancement features, tool life is substantially improved.

The measurements of surface roughness, hardness, and residual stress of machined parts were made on the slotted titanium samples used for tool-life tests. With regard to surface roughness, the testing demonstrated that the cutting tool corresponding to the embodiment shown in FIG. 1 with a flow rate of 0.16 L/min of cryogen (approximately 0.08 L/min/cutting edge for two edges) at least equals the performance of flood cooling with a flow rate of 15 Liters/min of conventional coolant flow in terms of machined surface roughness. It is believed that the cutting tool with indirect insert tooling may in fact improve the surface condition of the machined part at higher cutting speeds.

Surface hardness was measured with a Rockwell tester in the geometric center of the machined slots. For all of the machined surfaces tested, the Rockwell C hardness was approximately 3 RC units below the virgin, unstressed material. This suggests that there is no correlation between the resultant hardness and the cutting tool cooling methodology. As a result, the cutting tool with indirect insert tooling had no unexpected effect on the material microstructure of the workpiece material.

The residual stress distribution was measured using X-ray diffraction. Residual stress is an indicator of fatigue life. The results for the cutting tool with indirect insert cooling indicates that the indirect cooling has no negative influence on the residual stress distribution near the machined part surface or on the fatigue life of the part when compared to conventional flood cooling.

A test block of titanium was machined to demonstrate the effectiveness of the embodiment shown in FIGS. 3 and 4. The machining was performed on a block of mill annealed Ti6Al4V that is nominally 2.75 by 8 by 21 in. into which two parallel deep pockets were machined using a vertical CNC machining center. The pockets each have dimensions of 2.5 by 3.55 by 20.6 in. The purpose of this test was to demonstrate the performance of the indirectly cooled tool and to produce titanium fatigue test samples. The outside of the titanium block was skim cut on all six sides. During the demonstration, machining was performed using the indirectly cooled tool for 160 minutes (20 passes at 8 min each) prior to changing inserts. As a comparison, when machining using a standard tool with flood cooling, machining was performed for 46 minutes (21 passes at 2.2 min) before the inserts were worn (0.3 mm flank wear) to the same point as the inserts that were indirectly cooled. This shows the indirect cooling of the inserts increases tool life by nearly 3.5 times that of conventional flood coolant and standard inserts. The fatigue test results confirmed that coupons that were machined using the indirect insert cooling method possess equivalent fatigue strength to those machined using a conventional flood cooling.

Figure 9:
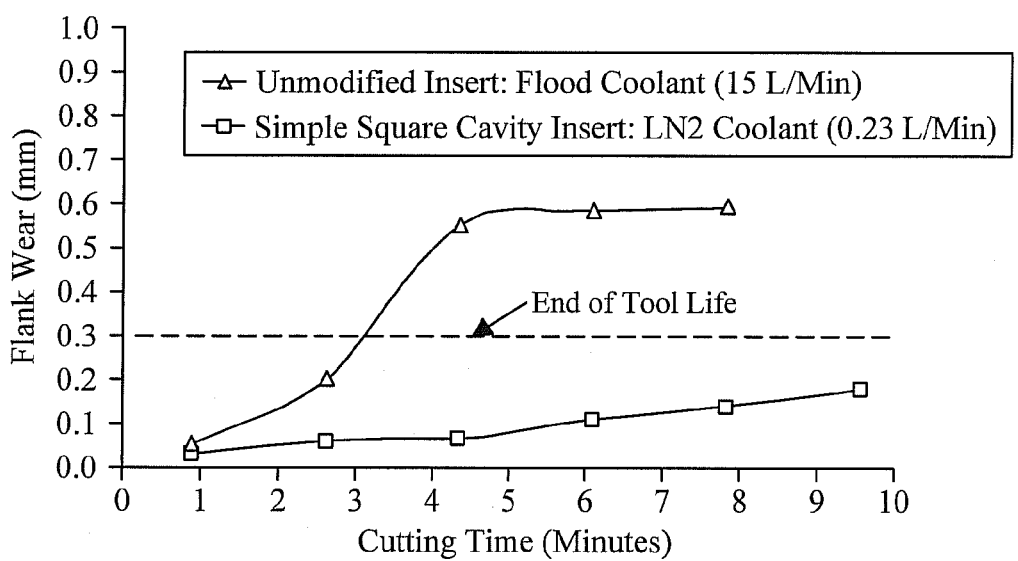
FIG. 9 is a graph showing tool life of a rotating tool.

FIG. 9 shows that tool life of a rotating tool as shown in FIG. 3 with the indirect cooling system is nearly 600% longer than with conventional flood cooling. Tool life is calculated as the amount of machining time before reaching 0.3 mm average flank wear. The 0.3 mm flank wear measurement is consistent with Section 7 of ANSI/ASME B94.55M-1985 (Reaffirmed 1995) which defines industry accepted tool life criteria and tool wear measurements.

FIG. 9 is a plot of average flank wear versus cutting time using standard inserts with flood cooling and modified inserts with the indirect cooling system. FIG. 9 shows that the modified inserts with the indirect cooling system have much less wear than unmodified inserts with standard flood coolant. At the point in time (about three minutes) where the flood coolant inserts have reached their 0.3-mm flank wear life limit, the indirect cooling system with simple square cavity inserts are at 0.05-mm flank wear. Further machining using the indirect cooling system with simple square cavity inserts shows that after nine minutes, the indirect cooled inserts have reached only one half of the 0.3-mm flank wear life limit.

The indirect cutting tool cooling system approach to machining titanium alloys substantially reduces the cutting tool temperature and, thereby, enables significant increases in processing speed. The indirect cutting tool cooling system greatly improves the marketability of titanium components and should result in an increase the use of titanium in other applications.

The design directs cooling where it is needed most for the high-speed machining of titanium, i.e., the cutting edge. In doing so, indirect cooling as described reduces the temperature of the cutting tool, without unnecessarily cooling the part being machined. The net result is a dramatic improvement in processing speed, which significantly decreases processing costs.

Having thus described the invention, various alterations and modifications will occur to those skilled in the art, which alterations and modifications will be within the scope of the invention as defined in the appended claims.

We claim:

1. An indirect cooling system for a rotating tool having a tool body and a cutting element, the system comprising:
   at least one specific area on the tool body for mounting the cutting element;
   an indirect channel in the tool body for conducting coolant that is at a temperature that is less than ambient temperature to the rear face of the cutting element;
   a cryogen comprising the coolant;
   a cavity formed in the rear face of the cutting element for receiving the coolant from the channel; whereby the coolant in the cavity cools the cutting element; and
   an exhaust port in the cavity and an exhaust outlet coupled to the exhaust port on the face of the cutting element, whereby coolant flowing into the cavity can be exhausted to atmosphere through the exhaust outlet, wherein the cutting system uses a flow rate that is less than ten percent of the flow rate required for conventional flood coolants when machining the same workpiece, and wherein the coolant uses the latent heat of vaporization of the cryogen to remove heat from the cutting element.

2. The indirect cooling system of claim 1 further comprising:
   fins formed in the cavity, whereby the fins enhance the transfer of thermal energy from the cutting element to the coolant.

3. The indirect cooling system of claim 1 whereby the coolant is able to reduce the temperature of the cutting element when machining a workpiece using a flow rate that is less than two percent of the flow rate required for synthetic coolants when machining the same workpiece.

4. The indirect cooling system of claim 1 further comprising:
   an opening on the tool body for spraying coolant on the insert; and,
   a direct cooling channel in the tool body for conducting coolant to the opening, whereby the cutting element is cooled by a coolant being sprayed on the element and by coolant being applied to the rear face of the element.

5. The indirect cooling system of claim 1 wherein the cutting tool element is a cutting tool insert.

6. The indirect cooling system of claim 5 further comprising:
   at least two pockets formed in the tool body for receiving an insert and an insert mounted in each pocket, each pocket having an indirect cooling channel for conducting coolant to the rear face of the insert, whereby each of the inserts in the tool body are cooled by indirect cooling.

7. The indirect cooling system of claim 6 further comprising:
   at least two jet openings mounted on the tool body and spaced from the inserts; and,
   a direct cooling channel coupled to each of the jet openings for supplying coolant to the jet openings, whereby the jet openings spray coolant onto the inserts to directly cool the inserts while the inserts are indirectly cooled by the coolant supplied to the cavity on the rear face of the inserts.

8. The indirect cooling system of claim 1 wherein the cutting tool element is brazed or otherwise permanently affixed to the tool body.

9. The indirect cooling system of claim 1, wherein the flow rate of the coolant is 0.08 L/min for each cutting edge.

* * * * *